United States Patent
Choi

(10) Patent No.: US 10,564,771 B2
(45) Date of Patent: Feb. 18, 2020

(54) TOUCH DISPLAY SYSTEM INCLUDING A POWER MANAGEMENT INTEGRATED CIRCUIT PROVIDING MODULATED GROUND VOLTAGE TO A DISPLAY SYSTEM AND A TOUCH SYSTEM

(71) Applicant: SAMSUNG ELECTRONICS CO., LTD., Suwon-si, Gyeonggi-Do (KR)

(72) Inventor: Yoon-Kyung Choi, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 138 days.

(21) Appl. No.: 15/220,536

(22) Filed: Jul. 27, 2016

(65) Prior Publication Data
US 2017/0046004 A1  Feb. 16, 2017

(30) Foreign Application Priority Data

Aug. 10, 2015 (KR) .......................... 10-2015-0112725

(51) Int. Cl.
*G09G 3/36* (2006.01)
*G09G 3/30* (2006.01)
*G06F 3/044* (2006.01)
*G06F 3/041* (2006.01)

(52) U.S. Cl.
CPC ............ *G06F 3/0418* (2013.01); *G06F 3/044* (2013.01); *G06F 3/0412* (2013.01)

(58) Field of Classification Search
CPC .................. G09G 2330/00–028; G09G 1/005
See application file for complete search history.

(56) References Cited

U.S. PATENT DOCUMENTS

| 8,970,517 B2 | 3/2015 | Hwang et al. |
| 2008/0309467 A1* | 12/2008 | Araki ...................... G06F 3/016 340/407.1 |
| 2010/0327234 A1 | 12/2010 | Shim et al. |
| 2011/0141042 A1* | 6/2011 | Kim .................... G02F 1/13338 345/173 |
| 2011/0210938 A1 | 9/2011 | Kuang et al. |
| 2011/0242050 A1 | 10/2011 | Byun et al. |
| 2012/0223647 A1* | 9/2012 | Brokaw ............... G09G 3/3696 315/160 |
| 2013/0057337 A1 | 3/2013 | Kang |
| 2013/0271422 A1 | 10/2013 | Hotelling et al. |

(Continued)

FOREIGN PATENT DOCUMENTS

| CN | 101324823 | 12/2008 |
| CN | 101546238 | 9/2009 |

(Continued)

OTHER PUBLICATIONS

Chinese Office Action dated Oct. 31, 2018.
Chinese Office Action dated Jul. 1, 2019.

*Primary Examiner* — Sanghuk Park
(74) *Attorney, Agent, or Firm* — F. Chau & Associates, LLC

(57) ABSTRACT

A touch display system includes a display system including a plurality of pixels, a touch system disposed on the display system and comprising a plurality of touch sensor electrodes, and a power management integrated circuit (PMIC) configured to supply power and a modulated ground (GND) voltage to the display system and the touch system.

20 Claims, 14 Drawing Sheets

(56) References Cited

U.S. PATENT DOCUMENTS

| | | | |
|---|---|---|---|
| 2014/0049507 A1* | 2/2014 | Shepelev | G06F 3/0412 345/174 |
| 2014/0152617 A1* | 6/2014 | Kida | G06F 3/044 345/174 |
| 2014/0354572 A1 | 12/2014 | Zhao et al. | |
| 2014/0375601 A1 | 12/2014 | Liu et al. | |
| 2015/0169108 A1* | 6/2015 | Ishii | G06F 3/044 345/174 |

FOREIGN PATENT DOCUMENTS

| | | |
|---|---|---|
| CN | 102096221 | 6/2011 |
| CN | 102473047 | 5/2012 |
| CN | 102495707 | 6/2012 |
| CN | 104714686 | 6/2015 |
| JP | 2010-218199 | 9/2010 |
| JP | 2011-180401 | 9/2011 |
| JP | 2013-114326 | 6/2013 |
| KR | 1020100138745 | 12/2010 |
| KR | 1020110064405 | 6/2011 |

\* cited by examiner

TOUCH DISPLAY SYSTEM INCLUDING A POWER MANAGEMENT INTEGRATED CIRCUIT PROVIDING MODULATED GROUND VOLTAGE TO A DISPLAY SYSTEM AND A TOUCH SYSTEM

CROSS-REFERENCE TO RELATED APPLICATION

This application claims priority under 35 U.S.C. § 119 to Korean Patent Application No. 10-2015-0112725, filed on Aug. 10, 2015, in the Korean Intellectual Property Office, the disclosure of which is incorporated by reference herein in its entirety.

TECHNICAL FIELD

The inventive concept relates to a touch display system, and more particularly, to a touch display system using ground (GND) modulation.

DISCUSSION OF THE RELATED ART

Thin display devices have been increasingly used in mobile devices to reduce weights thereof, secure a sufficient battery space for extending battery utilization, and realize flexible displays. Display devices include a display panel and a touch screen panel that allow a user to input a command by selecting content displayed on the screen of the display panel by using a hand or a pen. As display devices are formed to be thinner, a display panel electrode and a touch screen panel electrode are located closer to each other, and thus, a parasitic capacitance of a touch sensor formed on the touch screen panel increases. A large parasitic capacitance of the touch sensor may increase power consumption for driving the touch sensor and also decrease the sensing sensitivity in relation to a touch event.

SUMMARY

According to an exemplary embodiment of the inventive concept, a touch display system includes a display system including a plurality of pixels. A touch system is disposed on the display system and includes a plurality of touch sensor electrodes. A power management integrated circuit (PMIC) is configured to supply power and a modulated ground (GND) voltage to the display system and the touch system.

In an exemplary embodiment of the inventive concept, the modulated GND voltage of the touch display system oscillates between two predetermined voltage levels.

In an exemplary embodiment of the inventive concept, the modulated GND voltage oscillates in a square wave shape, a sine wave shape, or a chopping wave shape.

In an exemplary embodiment of the inventive concept, the touch display system further includes a display drive integrated circuit (DDI) configured to drive the display system and a touch screen controller (TSC) configured to drive the touch system. The modulated GND voltage is connected to GND voltages of the DDI and the TSC.

In an exemplary embodiment of the inventive concept, the touch display system further includes a GND modulator configured to generate the modulated GND voltage based on an interface signal output by the TSC. The GND modulator is disposed inside or outside of the PMIC.

In an exemplary embodiment of the inventive concept, the PMIC generates a first internal power having a positive voltage level and a second internal power having a negative voltage level. The first internal power and the modulated GND voltage are provided to a first low-dropout (LDO) regulator, wherein the first LDO regulator outputs a first power. The second internal power and the modulated GND voltage are provided to a second LDO regulator, wherein the second LDO regulator outputs a second power. The first power and the second power are provided to the display system.

In an exemplary embodiment of the inventive concept, the PMIC generates a third internal power having a lower voltage level than the first internal power and a fourth internal power having a lower voltage level than the third internal power. The third internal power and the modulated GND voltage are provided to a third LDO regulator, wherein the third LDO regulator outputs a third power, and the DDI is driven based on the third power and the modulated GND voltage. The fourth internal power and the modulated GND voltage are provided to a fourth LDO regulator, wherein the fourth LDO regulator outputs a fourth power, and the TSC is driven based on the fourth power and the modulated GND voltage.

In an exemplary embodiment of the inventive concept, interface signals respectively output by the DDI and the TSC have levels that are changed by the modulated GND voltage. The PMIC further includes a plurality of level shifters configured to compensate for the changed levels of the interface signals output by the DDI and the TSC, respectively, and to provide interface signals having compensated levels to a host.

In an exemplary embodiment of the inventive concept, a first level shifter of the plurality of level shifters to which a first interface signal output by the DDI is supplied is connected to a second level shifter of the plurality of level shifters to which a second interface signal output by the TSC is supplied. The first and second interface signals are transmitted between the DDI and the TSC.

In an exemplary embodiment of the inventive concept, touch sensor electrodes of the touch screen panel are dot sensors driven in a self capacitance method via channels respectively connected to the touch sensor electrodes.

According to an exemplary embodiment of the inventive concept, a touch display system includes a display panel including a plurality of pixels. A touch screen panel is disposed on the display panel and includes a plurality of touch sensor electrodes. A display drive integrated circuit (DDI) is configured to drive the display panel. A touch screen controller (TSC) is configured to drive the touch screen panel. A power management integrated circuit (PMIC) is configured to supply power and a modulated ground (GND) voltage to the display panel, the touch screen panel, the DDI, and the TSC. The modulated GND voltage is supplied to a partial area of the DDI and a partial area of the TSC.

In an exemplary embodiment of the inventive concept, circuits associated with a driving operation of the display panel are disposed in the partial area of the DDI. Circuits that generate a first interface signal that is provided to a host are disposed in an area of the DDI that excludes the partial area of the DDI.

In an exemplary embodiment of the inventive concept, circuits associated with a driving operation of the touch screen panel are disposed in the partial area of the TSC. Circuits that generate a second interface signal that is provided to a host are disposed in an area of the TSC that excludes the partial area of the TSC.

In an exemplary embodiment of the inventive concept, the modulated GND voltage oscillates in a square wave shape, a sine wave shape, or a chopping wave shape according to an interface signal that is output by the TSC.

In an exemplary embodiment of the inventive concept, the plurality of touch sensor electrodes of the touch screen panel are dot sensors driven in a self capacitance method using channels that electrically connect respective touch sensor electrodes of the plurality of touch sensor electrodes and the TSC.

According to an exemplary embodiment of the inventive concept, a touch display system includes a main printed circuit board (PCB), a display panel, a touch screen panel disposed on the display panel, and a power management integrated circuit (PMIC) disposed on the main PCB. The PMIC is configured to supply power and a modulated ground (GND) voltage to a display drive integrated circuit (DDI) and to a touch screen controller (TSC). The DDI is configured to drive the display panel. The TSC is configured to drive the touch screen panel.

In an exemplary embodiment of the inventive concept, the PMIC is electrically connected to the display panel through a first flexible printed circuit board (FPCB) and the PMIC is electrically connected to the touch screen panel through a second FPCB.

In an exemplary embodiment of the inventive concept, the TSC is disposed on the second FPCB and the DDI is disposed on the display panel.

In an exemplary embodiment of the inventive concept, the modulated GND voltage supplied by the PMIC to the DDI and the TSC is generated by a GND modulator disposed on the main PCB.

In an exemplary embodiment of the inventive concept, the touch screen panel includes transparent electrodes electrically connected to the TSC.

BRIEF DESCRIPTION OF THE DRAWINGS

Exemplary embodiments of the inventive concept will become more clearly understood from the following detailed description taken in conjunction with the accompanying drawings in which.

DETAILED DESCRIPTION OF THE EMBODIMENTS

Figure 1:
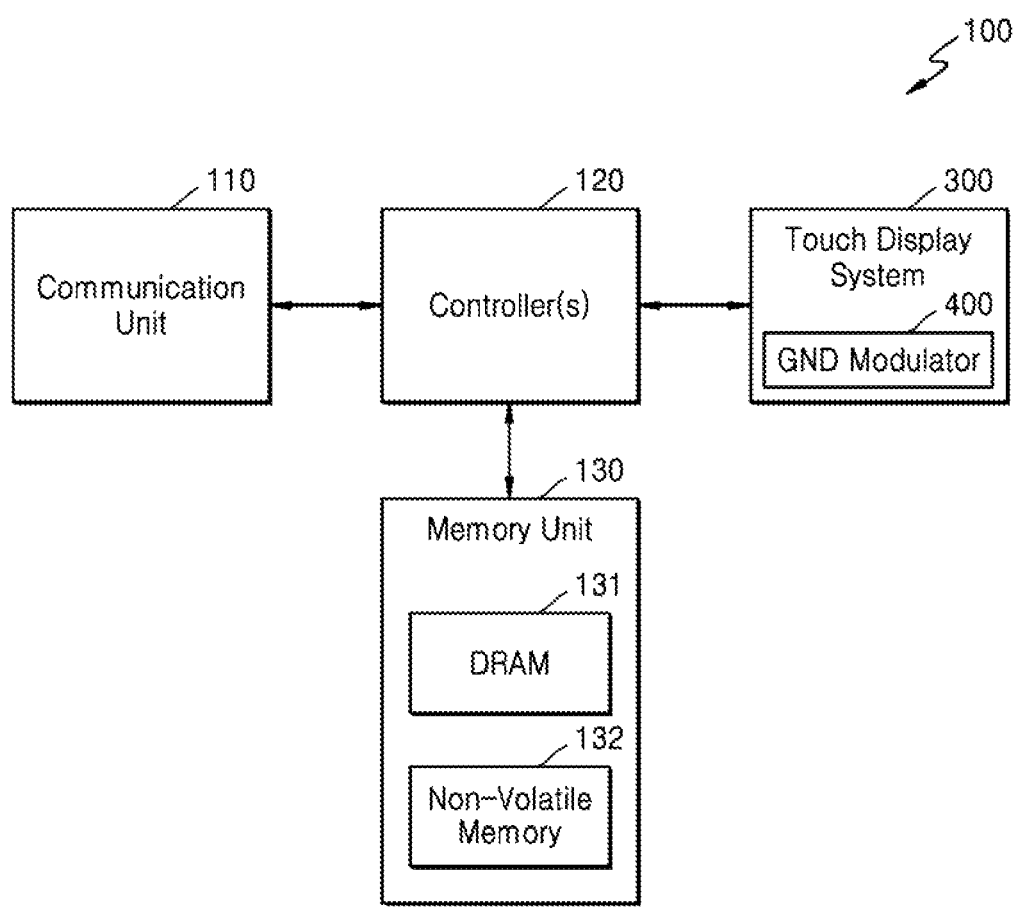
FIG. 1 is a block diagram illustrating a mobile device including a touch display system using ground (GND) modulation, according to an exemplary embodiment of the inventive concept.

Hereinafter, the inventive concept will be described more fully with reference to the accompanying drawings, in which exemplary embodiments of the inventive concept are shown. These embodiments are provided so that this disclosure may be thorough and complete, and may fully convey the scope of the inventive concept to one of ordinary skill in the art. As the inventive concept allows for various changes to the exemplary embodiments thereof, changes, equivalents, and substitutes to the exemplary embodiments of the inventive concept that do not depart from the spirit and scope of the inventive concept are included in the inventive concept. Like reference numerals may denote like elements throughout the specification. In the drawings, the sizes and/or thicknesses of elements may be exaggerated for clarity of explanation.

The terms used in the present specification may be used to describe particular embodiments, and are not intended to limit the inventive concept. A term used to describe an element in a singular form may encompass a plural form, unless the context clearly indicates otherwise.

FIG. 1 is a block diagram illustrating a mobile device 100 including a touch display system 300 using ground (GND) modulation, according to an exemplary embodiment of the inventive concept.

Referring to FIG. 1, the mobile device 100 may be, for example, a portable terminal or a mobile device including a mobile phone such as a SAMSUNG GALAXY S phone, an APPLE IPHONE, a tablet such as a SAMSUNG GALAXY TAB, an APPLE IPAD, and the like. However, the mobile device 100 is not limited to these devices. The mobile device 100 includes a communication unit 110, a controller 120 or a plurality of controllers 120, a memory unit 130, and the touch display system 300. The touch display system 300 includes a GND modulator 400 which changes a GND voltage level of the touch display system 300 according to time and generates a modulated GND voltage.

The communication unit 110 transmits or receives a wireless signal of data that is input or output via an antenna of the mobile device 100. In addition, the communication unit 110 may transmit or receive data of a computer system that is connected to the communication unit 110 via a Universal Serial Bus (USB) port. The controller 120 controls and processes various operations of the mobile device 100. The memory unit 130 stores various kinds of programs and data that are used to perform various operations of the mobile device 100. The memory unit 130 may include at least one dynamic random access memory (DRAM) 131 and at least one non-volatile memory 132.

The DRAM 131 temporarily stores data that is processed by the mobile device 100 under the control of the controller 120. The non-volatile memory 132 includes flash memory. The non-volatile memory 132 may download and/or store a bootloader and an operating system (OS) of the mobile device 100. The non-volatile memory 132 performs a mass storage function of the mobile device 100. The non-volatile memory 132 may denote an embedded memory card that uses a Secure Digital/Multi-Media Card (SD/MMC) interface protocol. The non-volatile memory 132 receives data stored in the DRAM 131 via an SD/MMC interface and stores the received data.

The touch display system 300 includes a display panel which displays status information of the mobile device 100, numbers, characters, and other information that is generated during an operation of the mobile device 100. The display panel may display a list of content items stored in the non-volatile memory 132 and pieces of version information of the content items, under the control of the controller 120.

The display panel includes a plurality of pixels. The plurality of pixels may be arranged in a matrix and may form a pixel array. The plurality of pixels are connected to a plurality of gate lines and a plurality of data lines. The display panel may control an output of the plurality of pixels by controlling voltages and currents of the plurality of gate lines and the plurality of data lines under the control of a Display Drive Integrated circuit (DDI). A display system of the mobile device 100 may include the display panel and the DDI.

The touch display system 300 further includes a touch screen panel enabling a user to rapidly manipulate or change content displayed on the touch screen panel of the touch display system 300. When a finger or touch pen of the user approaches or contacts the touch screen panel, the touch screen panel outputs signals corresponding to the approached or contacted location of the touch screen panel to the controller 120.

The touch screen panel further includes a plurality of touch sensor electrodes formed as transparent electrodes, such as Indium Tin Oxide (ITO), on a transparent substrate. When a finger or touch pen of the user approaches or contacts the touch screen panel, the touch screen panel provides a capacitance value corresponding to the approached or contacted location to a touch screen controller (TSC). The TSC senses a capacitance change of the touch sensor electrodes and generates a touch signal. The capacitance change of the touch sensor electrodes is usually sensed using a method of measuring a change in a current or a charge amount while changing potentials of the touch sensor electrodes. A touch system of the mobile device 100 may include the touch screen panel and the TSC.

The touch display system 300 includes the GND modulator 400, which provides a modulated GND voltage NGND to both the display panel and the touch screen panel. The GND modulator 400 generates the modulated GND voltage NGND which oscillates a GND voltage of the touch display system 300 between two predetermined voltage levels. The modulated GND voltage NGND has a voltage level that oscillates in a square wave shape, a sine wave shape, or a chopping (e.g., sawtooth) wave shape. In an exemplary embodiment of the inventive concept, the GND modulator 400 is configured to generate the modulated GND voltage based on an interface signal output by the TSC.

Based on the modulated GND voltage NGND of the GND modulator 400, a potential on both ends of a parasitic capacitance between a display panel drive electrode and a touch screen panel sensor electrode is constantly maintained without changes. In addition, at the same time, a potential of the touch screen panel sensor electrode is changed for an external GND voltage. Thus, a touch may be sensed. In this case, a parasitic capacitance between a display electrode and a touch sensor electrode need not need to be charged or discharged when a touch is sensed. Thus, even when the parasitic capacitance between the display panel drive electrode and the touch screen panel sensor electrode greatly increases with a decrease in the thickness of the touch display system 300, power consumption may be prevented from increasing.

FIGS. 2A-2E are graphs illustrating loads that may be generated in a touch display system, according to an exemplary embodiment of the inventive concept. The touch display system has a structure in which a touch screen panel is formed on a display panel. Thus, in the touch display system, a display panel substrate and a touch screen panel substrate may be discrete substrates or may be integrated with each other.

Figure 2A:
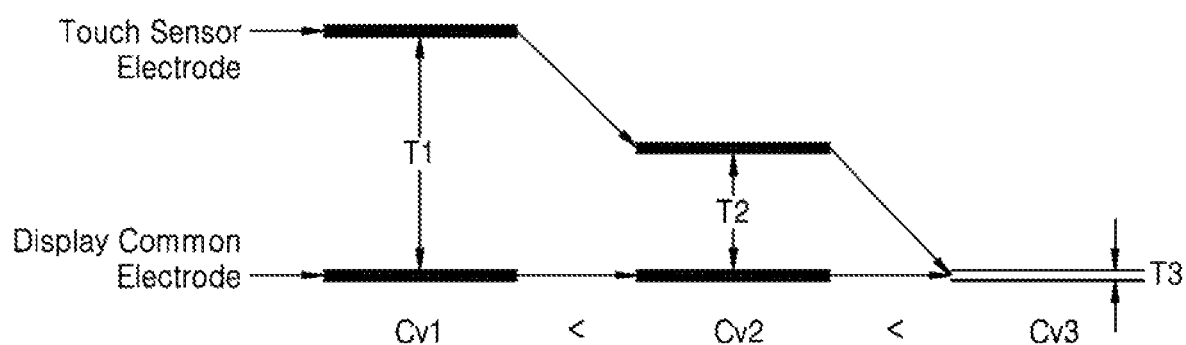
FIGS. 2A-2E are graphs illustrating loads that may be generated in a touch display system, according to an exemplary embodiment of the inventive concept.

Referring to FIG. 2A, as the touch display system becomes thinner, a distance between the display panel and the touch screen panel decreases. As a distance between a touch sensor electrode of the touch screen panel and a display common electrode gradually decreases to T1, T2, and T3, a parasitic capacitance between the touch sensor electrode and the display common electrode gradually increases in the order of Cv1<Cv2<Cv3. The display common electrode denotes an upper plate electrode of the display panel. For example, an organic light-emitting display (OLED) panel has, as a common electrode, an ELVSS electrode which is a cathode electrode. A liquid crystal display (LCD) panel has a VCOM electrode as a common electrode. The increase in the parasitic capacitance (Cv1<Cv2<Cv3) between the touch sensor electrode and the display common electrode increases power consumption as shown in Equation 1.

$$P=(\tfrac{1}{2})CV^2f \qquad \text{[Equation 1]}$$

where P indicates power consumption when the touch sensor electrode is driven, C indicates the parasitic capacitances Cv1, Cv2, and Cv3 between the touch sensor electrode and the display common electrode, and V and f indicate a driving voltage and driving frequency, respectively, of the touch sensor electrode on the basis of a voltage of the display common electrode.

Figure 2B:
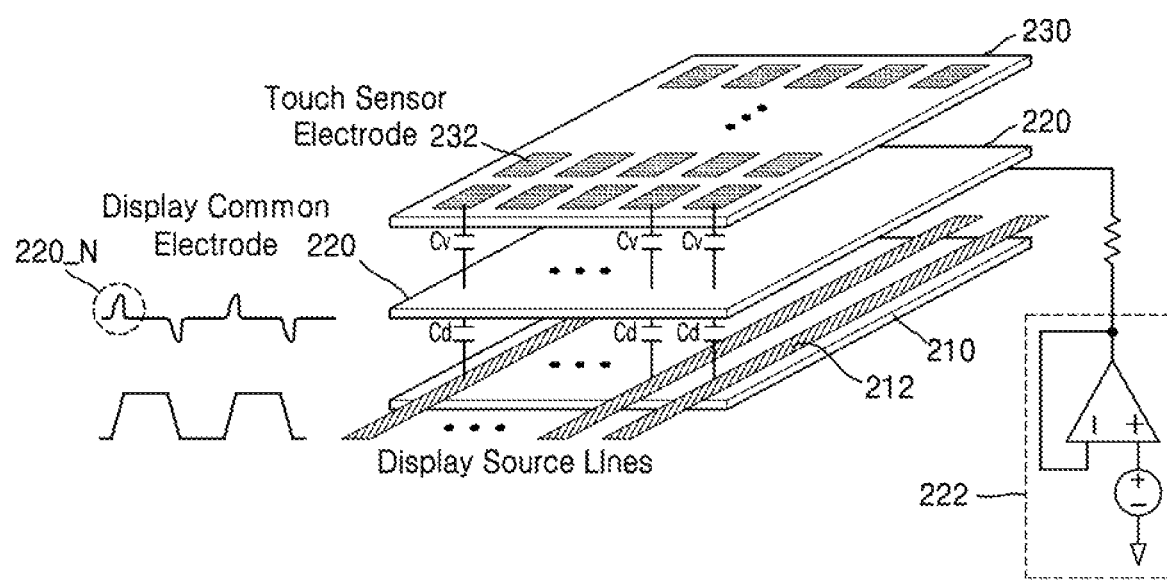

Referring to FIG. 2B, a display common electrode 220 is formed on a display panel 210, and a touch screen panel 230 is formed on the display common electrode 220. A plurality of source lines 212 are arranged in columns on the display panel 210, and a plurality of touch sensor electrodes 232 are arranged in rows and columns on the touch screen panel 230. In this layout, a first parasitic capacitance component Cv exists between the touch sensor electrodes 232 and the display common electrode 220, and a second parasitic capacitance component Cd exists between the display common electrode 220 and the source lines 212 of the display panel 210.

The display common electrode 220 is connected to a common electrode voltage driver 222. The common electrode voltage driver 222 receives and buffers a common electrode voltage and supplies the common electrode voltage to the display common electrode 220.

Image data transmitted to the source lines 212 of the display panel 210 may cause spontaneous interference noise 220_N to be generated in a potential of the display common electrode 220 by the second parasitic capacitance component Cd. The interference noise 220_N of the display common electrode 220 may cause noise to flow into the touch sensor electrodes 232.

When the touch sensor electrodes 232 are driven, the first parasitic capacitance component Cv may cause spontaneous noise to be generated in the potential of the display common electrode 220. The noise of the display common electrode 220 may affect the image data transmitted to the source lines 212 of the display panel 210 and degrade the quality of a display image.

Figure 2C:
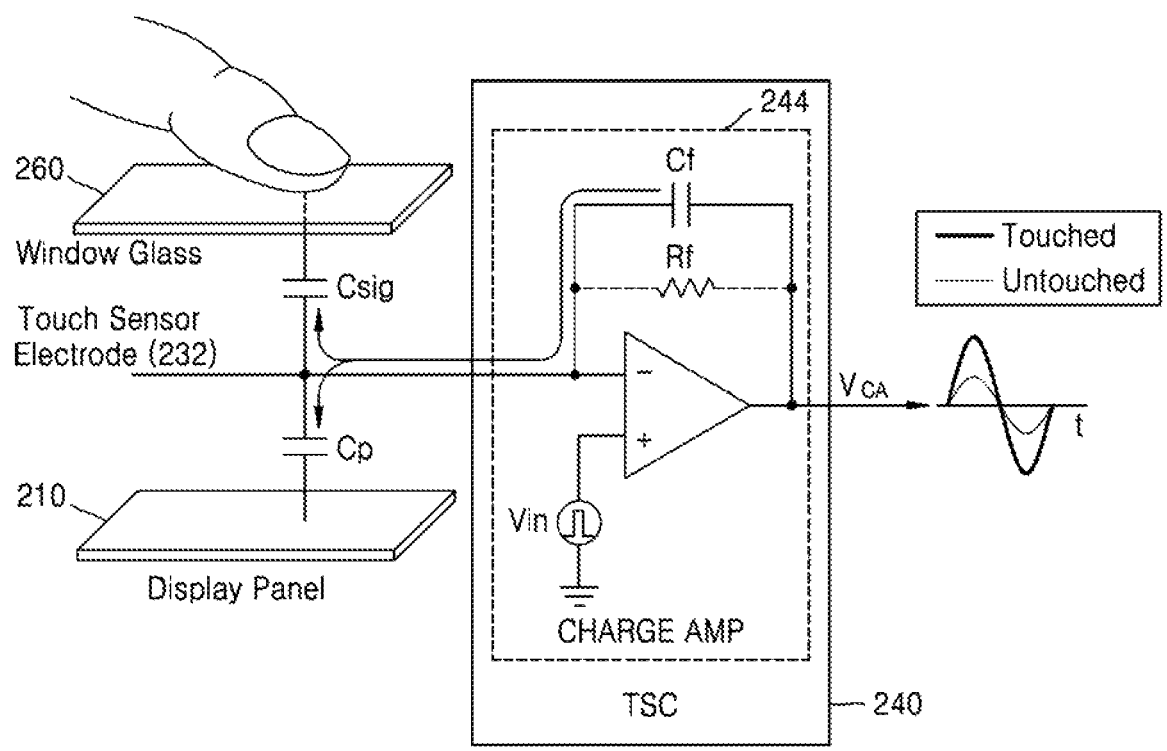

Referring to FIG. 2C, a touch action of a finger in contact with a window glass 260 is turned into a sensing signal $V_{CA}$ by a charge amplifier (amp) 244 of a TSC 240 that senses a capacitance change of the touch sensor electrodes 232. The charge amp 244 is an amplification circuit having a predetermined voltage gain, and a charge of a capacitor Cf within the charge amp 244 is used to sense the capacitance change of the touch sensor electrodes 232.

The capacitance of the touch sensor electrodes 232 includes a parasitic capacitance component Cp between the touch sensor electrodes 232 and the display panel 210. The capacitance of the touch sensor electrodes 232 includes a capacitance variation component of the touch sensor electrodes 232 due to a finger touch, namely, a signal capacitance component Csig. The charge amp 244 may output the sensing signal $V_{CA}$ while allocating the charge of the capacitor Cf to the parasitic capacitance component Cp and the signal capacitance component Csig.

Figure 2D:
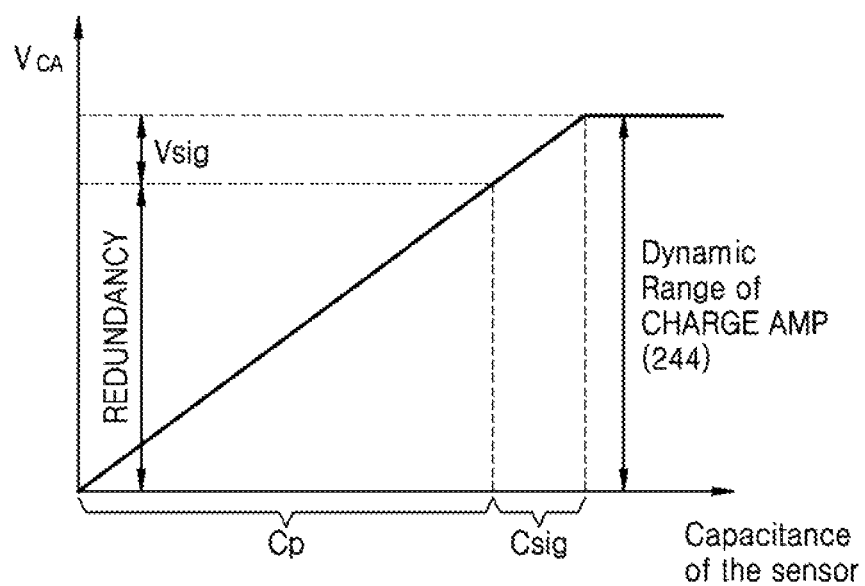

As shown in FIG. 2D, when the parasitic capacitance component Cp is large, a voltage region Vsig that is allocated to the signal capacitance component Csig by a touch event may greatly decrease. A dynamic range of the charge amp 244 is limited to a voltage range between a power voltage and a GND voltage of the charge amp 244. As shown in FIG. 2D, a large part of the dynamic range is allocated to a large parasitic capacitance component Cp and is redundantly used, as indicated by redundancy. When the voltage region Vsig representing touch event sensitivity decreases, rear-end circuits need to be very precisely designed to obtain a desired signal to noise ratio (SNR).

When the parasitic capacitance component Cp is large, a touch sensor bandwidth may decrease. To reduce an influence of various types of externally-introduced environmental noise, for example, battery charge noise and three-wave stabilizer noise, a touch sensing frequency needs to be a selected frequency that is not polluted by a noise frequency. However, when the touch sensor bandwidth is reduced by the large parasitic capacitance component Cp, it is difficult to increase a sensor driving frequency. Accordingly, the external environmental noise degrades a touch performance, causing a frequent malfunction of the touch display system.

Figure 2E:
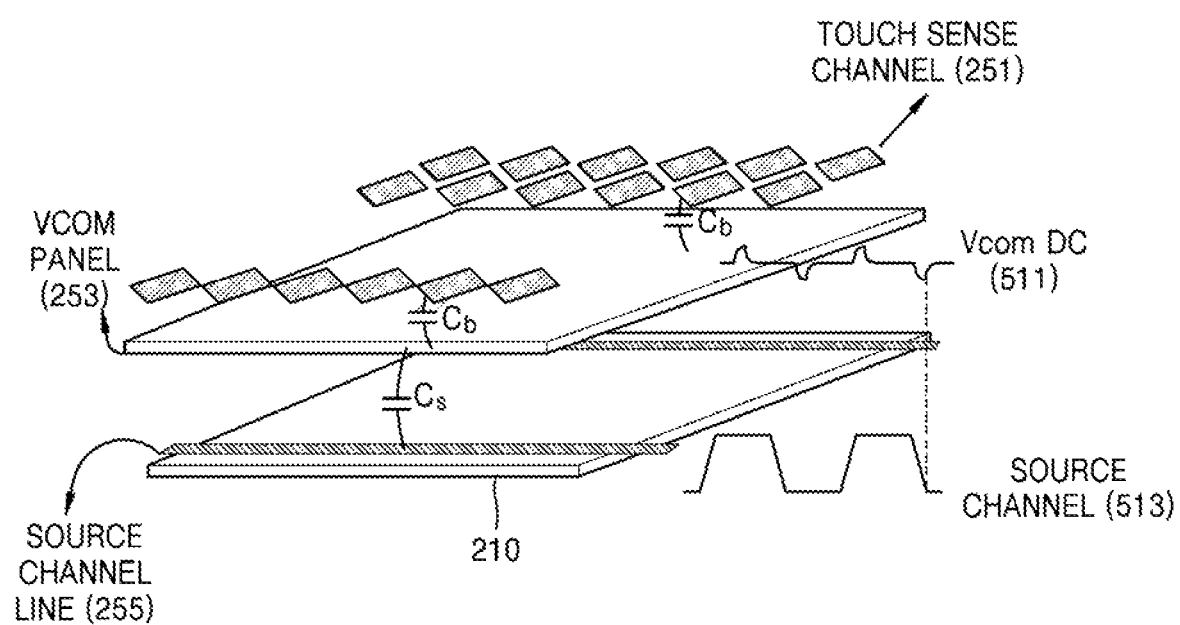

Referring to FIG. 2E, noise is generated in a VCOM direct current (DC) 511 according to a change in a source channel 513 on a source channel line 255 of the display panel 210. A value of a parasitic capacitor Cs generated between the source channel 513 and a common electrode panel 253 is 10 nF or greater. In the case of on-cell type touch display systems, the value of the parasitic capacitor Cb generated between a touch sense channel 251 and the common electrode panel 253 is several tens of pF or greater, which is very large. For example, when a plurality of source channels 513 are simultaneously activated and a data value of each of the source channels 513 is applied to each touch sense channel 251, the touch sense channels 251 are subjected to a large amount of noise.

Various GND modulations will now be described according to exemplary embodiments of the inventive concept. The various GND modulations reduce interference noise of the touch display system and power consumption of the touch screen panel, increase the touch sensing capability of the touch screen panel, and address problems of external noise.

Figure 3:
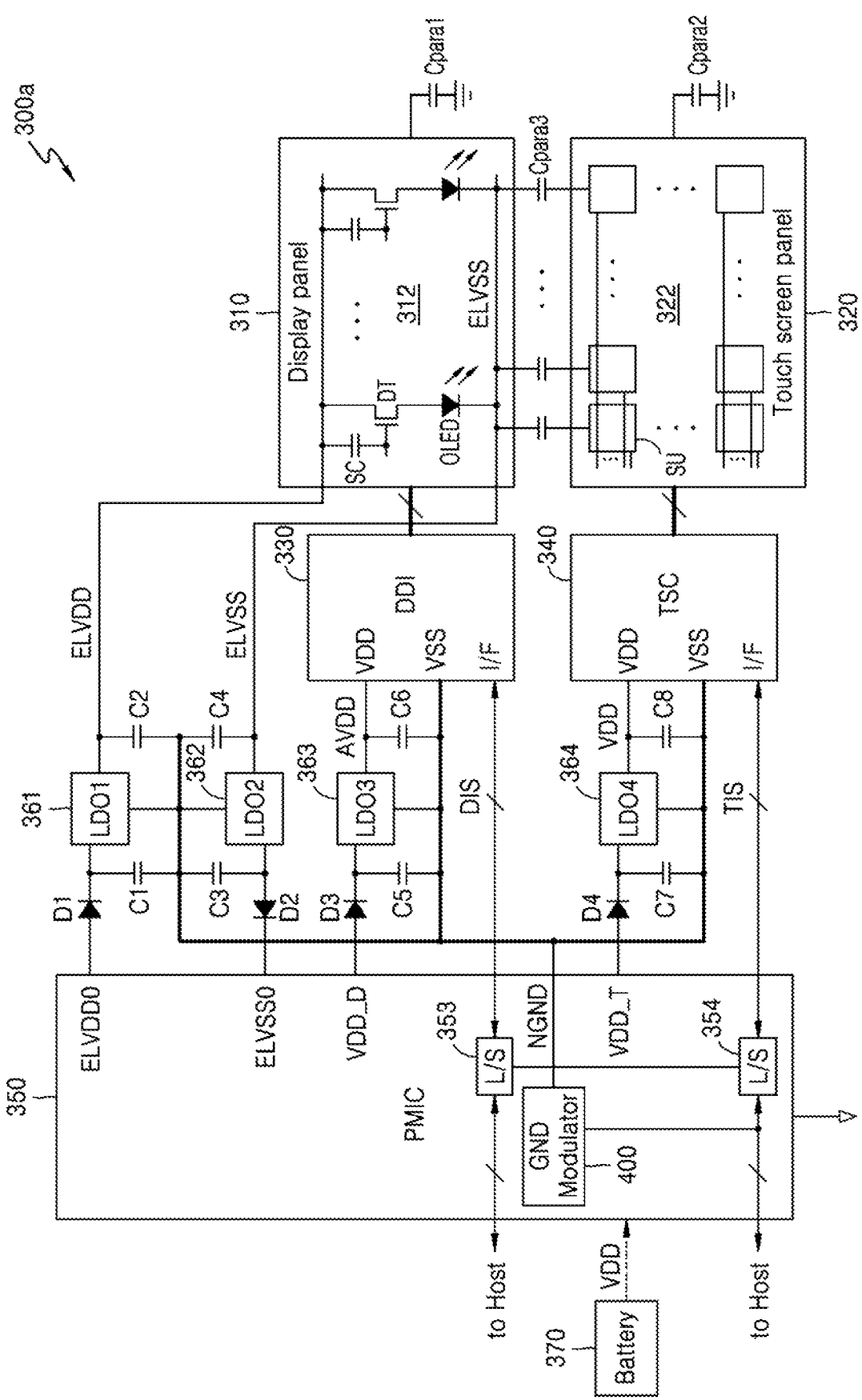
FIG. 3 is a circuit diagram illustrating a touch display system including a GND modulator, according to an exemplary embodiment of the inventive concept.

FIG. 3 is a circuit diagram illustrating a touch display system 300a including a GND modulator 400, according to an exemplary embodiment of the inventive concept.

Referring to FIG. 3, a touch display system 300a includes a display panel 310, a touch screen panel 320, a DDI 330, a TSC 340, and a power management integrated circuit (PMIC) 350. The PMIC 350 may include a GND modulator 400, which provides a GND voltage VSS of the DDI 330 and a GND voltage VSS of the TSC 340 as a modulated GND voltage NGND. According to an exemplary embodiment of the inventive concept, the GND modulator 400 may be realized as a separate integrated circuit (IC) outside the PMIC 350.

The display panel 310 includes a plurality of gate lines and a plurality of data lines, and a plurality of pixels formed at intersections between the gate lines and the data lines. The plurality of pixels may be arranged in a matrix and form a pixel array. The display panel 310 may be, for example, an LCD panel, a light emitting diode (LED) panel, an OLED panel, or a field emission display (FED) panel.

When the display panel 310 is an OLED panel, the display panel 310 may include OLEDs formed on an organic light-emitting substrate 312, and drive circuit units which are respectively electrically connected to the OLEDs and provide driving currents. Each of the drive circuit units may include a drive transistor DT and a storage capacitor SC. The drive transistor DT and the storage capacitor SC are connected to a switching transistor connected to a gate line and a data line, and drive an OLED.

The display panel 310 may control outputs of the plurality of OLEDs by controlling voltages and currents of the plurality of gate lines and the plurality of data lines under the control of the DDI 330. In briefly describing a principle in which the OLEDs are driven, when a gate signal is applied to a gate line and a switching transistor is turned on, a data signal transmitted along a data line is applied to a drive transistor DT and turns on the drive transistor DT. The data signal is stored in a storage capacitor SC and turns on the drive transistor DT for one frame, and consequently, a driving current for driving an OLED is applied from a first power ELVDD to the OLED and drives the OLED to emit light.

The DDI 330 controls the display panel 310. The DDI 330 may include a timing controller, a gate driver, and a data driver. The timing controller generates a gate driver control signal, a data driver control signal, and data, based on an image data signal and a system control signal received from an external device such as a graphic processing unit (GPU).

The gate driver selectively activates the gate lines of the display panel 310, based on the gate driver control signal, and selects rows of the pixel array. The data driver applies a plurality of driving voltages to the data lines of the display panel 310, based on the data driver control signal and the data. The display panel 310 may be driven by operations of the gate driver and the data driver, and may display an image corresponding to the image data signal.

The touch screen panel 320 includes a plurality of touch sensor electrodes SU formed as transparent electrodes on a transparent substrate 322. The transparent substrate 322 may be formed of, for example, polyethylene terephthalate (PET), polycarbonate (PC), polymethyl methacrylate (PMMA), polyethylene naphthalate (PEN), polyethersulfone (PES), cyclic olefin polymer (COC), a triacetylcellulose (TAC) film, a polyvinyl alcohol (PVA) film, a polyimide (PI) film, polystyrene (PS), K resin-containing biaxially oriented polystyrene (BOPS), glass, or tempered glass.

The transparent electrodes may be formed of various conductive materials such as ITO, Zinc oxide (ZnO), metal mesh, graphene, conductive polymer (e.g., poly(3,4-ethylenedioxythiophene) polystyrene sulfonate PEDOT/PSS), carbon nanotubes (CNTs), and silver (Ag) nanowires.

When the touch screen panel 320 is driven using a self capacitance method, each of the touch sensor electrodes SU may operate as a dot sensor. Capacitance of each of the touch sensor electrodes SU as a dot sensor changes according to a touch event, and each of the touch sensor electrodes SU as a dot sensor may transmit the changed capacitance to the TSC 340 via a channel that is connected with the touch sensor electrode SU.

According to an exemplary embodiment of the inventive concept, when the touch screen panel 320 is driven using a mutual capacitance method, the touch sensor electrodes SU may be connected to one another in rows and/or columns and operate as a line sensor. Constant voltage pulses are applied to touch sensor electrodes SU of a drive electrode as a line sensor, and touch sensor electrodes SU of a receive electrode as a line sensor collect charge corresponding to the voltage pulses. A capacitance between the drive electrode and the receive electrode may change according to a touch event, and the line sensors may transmit the changed capacitance to the TSC 340.

The TSC 340 senses the change in the capacitance of the touch sensor electrodes SU according to a touch event in the touch screen panel 320, and generates a sensing signal. By processing the sensing signal, the TSC 340 may output touch data used to determine whether a touch operation has been performed on the touch screen panel 320 and to determine a touched location on the touch screen panel 320.

The PMIC 350 stably supplies power to the touch display system 300$a$. The PMIC 350 generates a first internal power ELVDD0 and a second internal power ELVSS0 that are provided to the display panel 310. The PMIC 350 generates a third internal power VDD_D that is provided to the DDI 330 and a fourth internal power VDD_T that is provided to the TSC 340. The PMIC 350 generates a modulated GND voltage NGND that is commonly supplied to the DDI 330 and the TSC 340. The PMIC 350 may transform a charge voltage, for example, a main power voltage VDD received from a battery 370, to generate the first, second, third, and fourth internal power ELVDD0, ELVSS0, VDD_D, and VDD_T.

The PMIC 350 may include a low-dropout (LDO) regulator, a buck-boost converter, a buck regulator, and a boost regulator. The LDO regulator is a linear voltage adjuster that operates with a very small input-output differential voltage. The LDO regulator may regulate an output voltage of the buck-boost converter to output the first, second, third, and fourth internal power ELVDD0, ELVSS0, VDD_D, and VDD_T. As many LDO regulators as the number of first, second, third, and fourth internal power ELVDD0, ELVSS0, VDD_D, and VDD_T may be included. According to an exemplary embodiment of the inventive concept, first through fourth LDO regulators 361-364 are disposed outside the PMIC 350.

In the PMIC 350, the buck-boost converter may sense the main power voltage VDD, operate in a buck mode when the main power voltage VDD is higher than an output voltage of the buck-boost converter, and operate in a boost mode when the main power voltage VDD is lower than that of the buck-boost converter, thereby generating an always-constant output voltage.

In the PMIC 350, the buck regulator is a buck DC-to-DC converter, and may decompress an input voltage and generate a set voltage. The buck regulator may have a structure in which, when a switching device that switches on or off regularly is switched on, input power is connected to a circuit, and when the switching device is switched off, input power is disconnected therefrom. A pulse voltage that is periodically connected or disconnected may be averaged via an LC filter, and thus a DC voltage may be output. The buck regulator forms an output voltage by averaging a pulse voltage obtained by periodically chopping a DC voltage. The output voltage of the buck regulator always has a smaller value than an input voltage of the buck regulator, namely, the main power voltage VDD.

The boost regulator in the PMIC 350 is a boost DC-to-DC converter. When the boost regulator is switched on, the main power voltage VDD may be applied between ends of an inductor, and thus a current is charged. When the boost regulator is switched off, the charged current may be transmitted to a load. Accordingly, a current on an output end of the boost regulator is always smaller than that on an input end thereof. Since no components are lost because of an operational principle of the boost regulator, the output voltage appears higher than the input voltage, based on a relationship of "input current*input voltage=output current*output voltage".

In the PMIC 350, the GND modulator 400 generates the modulated GND voltage NGND by using a method of changing a GND voltage level of the touch display system 300$a$ according to time. The modulated GND voltage NGND may be generated to have a square wave shape, a sine wave shape, or a chopping wave shape that oscillates between two predetermined voltage levels.

The first internal power ELVDD0 output by the PMIC 350 may be input to the first LDO regulator 361 via a first diode D1 and be output as a first power ELVDD. The first power ELVDD is connected to the display panel 310 and supplies a drive current for driving the OLEDs. The first power ELVDD has a predetermined positive voltage level. The modulated GND voltage NGND is connected to the first LDO regulator 361. First and second capacitors C1 and C2 are connected between an input of the first LDO regulator 361 and the modulated GND voltage NGND and between an output of the first LDO regulator 361 and the modulated GND voltage NGND, respectively.

The second internal power ELVSS0 output by the PMIC 350 may be provided to the second LDO regulator 362 and be output as a second power ELVSS. A second diode D2 is connected between the second LDO regulator 362 and the second internal power ELVSS0. The second power ELVSS is connected to the OLEDs of the display panel 310. The second power ELVSS has a predetermined negative voltage level. The modulated GND voltage NGND is connected to the second LDO regulator 362. Third and fourth capacitors C3 and C4 are connected between an input of the second LDO regulator 362 and the modulated GND voltage NGND and between an output of the second LDO regulator 362 and the modulated GND voltage NGND, respectively.

Since the modulated GND voltage NGND output by the PMIC 350 is provided to the first and second LDO regulators 361 and 362 but a potential difference between the first power ELVDD and the second power ELVSS respectively generated by the first and second LDO regulators 361 and 362 is constantly maintained, the display panel 310 normally operates without influences of the modulated GND voltage NGND.

The third internal power VDD_D output by the PMIC 350 may be provided to the third LDO regulator 363 via a third diode D3 and be output as a third power AVDD. The third power AVDD is connected to the DDI 330 and supplies an operating voltage to the DDI 330. The third power AVDD may have a positive voltage level that is higher than the first power ELVDD.

The modulated GND voltage NGND is connected to the third LDO regulator 363. Fifth and sixth capacitors C5 and C6 are connected between an input of the third LDO regulator 363 and the modulated GND voltage NGND and between an output of the third LDO regulator 363 and the modulated GND voltage NGND, respectively. The third power AVDD generated by the third LDO regulator 363 and the modulated GND voltage NGND are respectively provided as operating power VDD and a GND voltage VSS of the DDI 330. Since a potential difference between the operating power VDD and the GND voltage VSS of the DDI 330 is constantly maintained by the third LDO regulator 363 and the sixth capacitor C6, the DDI 330 normally operates even when the modulated GND voltage NGND is connected to the GND voltage VSS.

The fourth internal power VDD_T output by the PMIC 350 may be provided to the fourth LDO regulator 364 via a fourth diode D4 and be output as a fourth power VDD. The fourth power VDD is connected to the TSC 340 and supplies an operating voltage to the TSC 340.

The modulated GND voltage NGND is connected to the fourth LDO regulator 364. Seventh and eighth capacitors C7 and C8 are connected between an input of the fourth LDO regulator 364 and the modulated GND voltage NGND and between an output of the fourth LDO regulator 364 and the modulated GND voltage NGND, respectively. The fourth power VDD generated by the fourth LDO regulator 364 and the modulated GND voltage NGND are respectively provided as operating power VDD and a GND voltage VSS of the TSC 340. Since a potential difference between the operating power VDD and the GND voltage VSS of the TSC 340 is constantly maintained by the fourth LDO regulator 364 and the eighth capacitor C8, the TSC 340 normally operates even when the modulated GND voltage NGND is connected to the GND voltage VSS.

In the touch display system 300*a*, a potential on both ends of a parasitic capacitance Cpara3 between the second power ELVSS, which is a common electrode of the display panel 310, and the touch sensor electrodes SU is uniformly maintained without changes, based on the fact that the first, second, third, and fourth power ELVDD, ELVSS, AVDD, and VDD are generated by the first, second, third, and fourth LDO regulators 361, 362, 363, and 364, respectively. The GND voltages VSS of the touch display system 300*a* are commonly connected to the modulated GND voltage NGND. Accordingly, since the parasitic capacitance Cpara3 need not be charged or discharged, power consumption does not occur even when the parasitic capacitance Cpara3 between the second power ELVSS and the touch sensor electrodes SU increases.

In the touch display system 300*a*, parasitic capacitance components that are charged or discharged by the modulated GND voltage NGND are parasitic capacitances Cpara1 and Cpara2, respectively existing between the display panel 310 and a GND voltage VSS of a device and between the touch screen panel 320 and the GND voltage VSS thereof. Since the parasitic capacitances Cpara1 and Cpara2 are much smaller than the parasitic capacitance Cpara3 between the second power ELVSS, which is a common electrode of the display panel 310, and the touch sensor electrodes SU, a GND modulation method according to an exemplary present embodiment of the inventive concept consumes little power.

In the touch display system 300*a*, levels of interface signals DIS and TIS that are output by the DDI 330 and the TSC 340 according to the modulated GND voltage NGND may change. To compensate for the changed levels, the PMIC 350 may further include first and second level shifters 353 and 354.

The second level shifter 354 may compensate for the level of the second interface signal TIS output via an interface (I/F) port of the TSC 340, and provide a second interface signal TIS having a compensated level to a host. The first and second level shifters 353 and 354 may be connected to each other, and thus enable the interface signals DIS and TIS to be directly communicated between the DDI 330 and the TSC 340. In an exemplary embodiment of the inventive concept, the GND modulator 400 is configured to generate the modulated GND voltage based on the interface signal TIS output by the TSC 340.

Figure 4A:
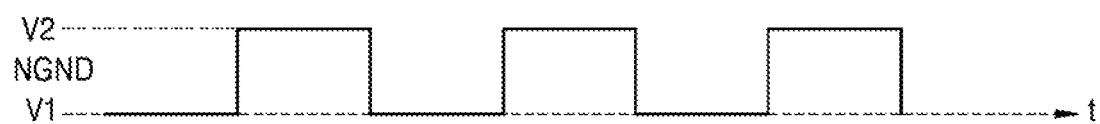
FIGS. 4A, 4B, and 4C are waveform diagrams illustrating a modulated GND voltage that is output by a GND modulator, according to exemplary embodiments of the inventive concept.
Figure 4B:
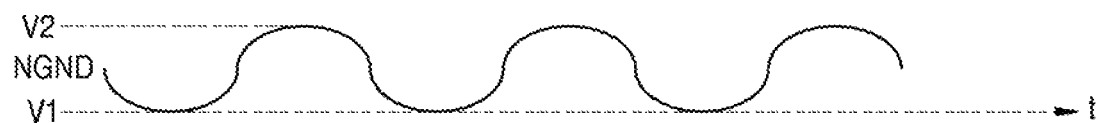
Figure 4C:
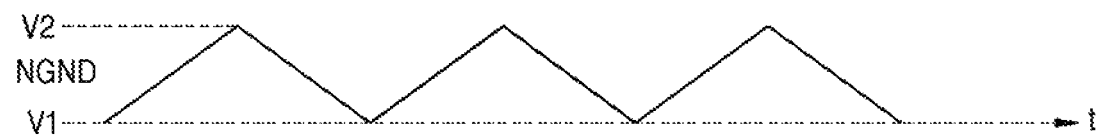

FIGS. 4A, 4B, and 4C are waveforms diagrams illustrating a modulated GND voltage NGND that is generated by a GND modulator, according to exemplary embodiments of the inventive concept.

The modulated GND voltage NGND may oscillate between two predetermined voltage levels V1 and V2 and oscillate in a square wave shape, as shown in FIG. 4A, a sine wave shape, as shown in FIG. 4B, or a chopping wave shape, as shown in FIG. 4C.

Figure 5:
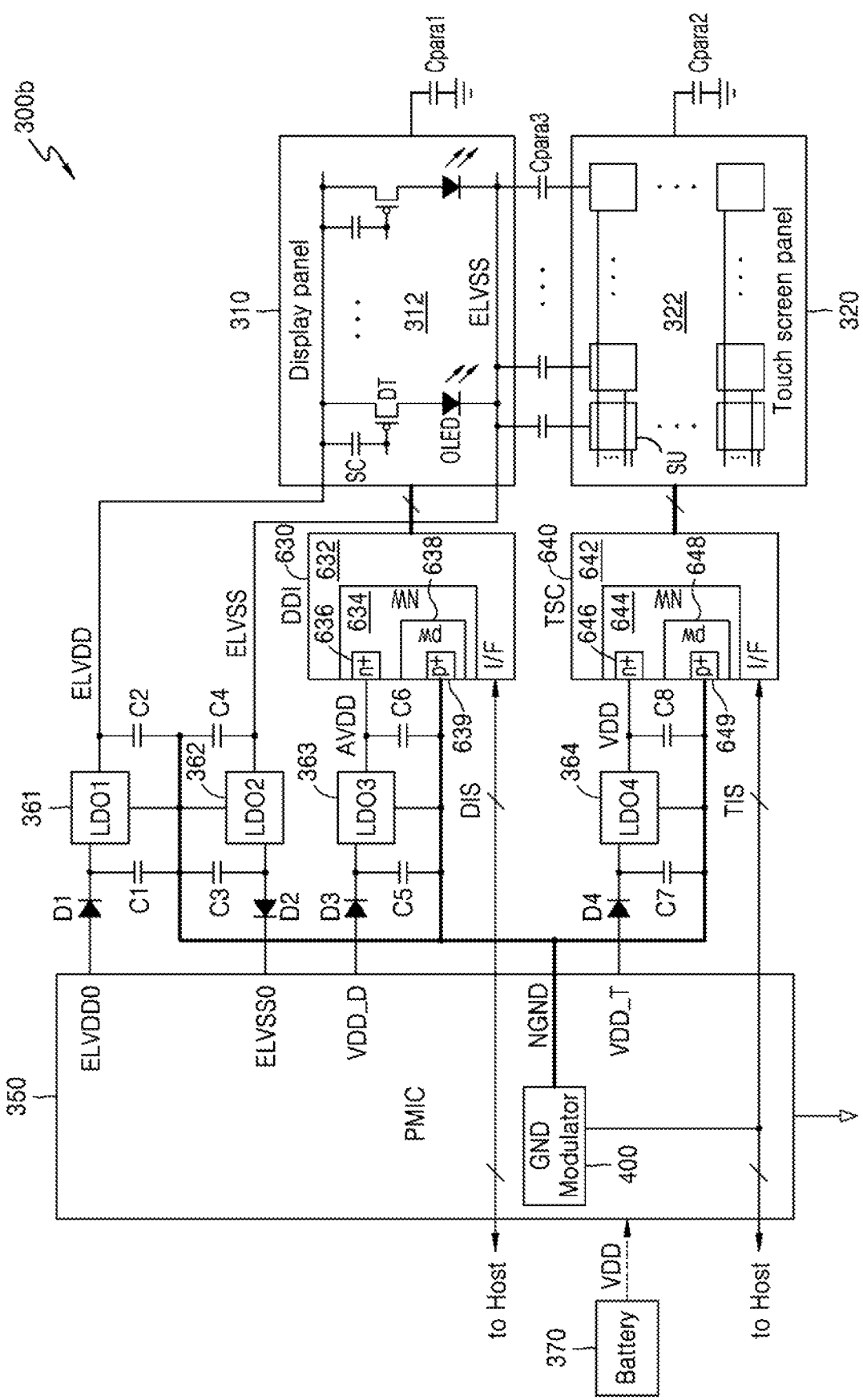
FIG. 5 is a circuit diagram illustrating a touch display system including a GND modulator, according to an exemplary embodiment of the inventive concept.

FIG. 5 illustrates a circuit diagram of a touch display system 300*b* including the GND modulator 400, according to an exemplary embodiment of the inventive concept.

Referring to FIG. 5, the touch display system 300*b* is substantially the same as the touch display system 300*a* of FIG. 3 except that the modulated GND voltage NGND is provided to a partial area of a DDI 630 and a partial area of a TSC 640, and that the PMIC 350 includes no level shifters.

The DDI 630 provides the modulated GND voltage NGND to a partial area including an n-well region 634 formed on a semiconductor substrate 632. The n-well region 634 includes an n+ contact region 636 and a p-well region 638. The n+ contact region 636 is connected to the third power AVDD and provides a bias voltage of the n-well region 634. The p-well region 638 includes a p+ contact region 639. The p+ contact region 639 is connected to the modulated GND voltage NGND and provides a bias voltage of the p-well region 638.

The partial area of the DDI 630, including the n-well region 634, is operated with the third power AVDD and the modulated GND voltage NGND respectively received as the operating power VDD and the GND voltage VSS. The partial area of the DDI 630, including the n-well region 634, may be designed such that circuits associated with a driving operation of the display panel 310 are arranged therein. In the remaining area of the DDI 630, circuits that interface with a host are arranged. The remaining area of the DDI 630 is operated with the normal GND voltage VSS other than the modulated GND voltage NGND and the operating power VDD. Accordingly, the DDI 630 and the host may transmit or receive the first interface signal DIS to or from each other without level compensation.

The TSC 640 provides the modulated GND voltage NGND to a partial area including an n-well region 644 formed on a semiconductor substrate 642. The n-well region 644 includes an n+ contact region 646 and a p-well region 648. The n+ contact region 646 is connected to the fourth power VDD and provides a bias voltage of the n-well region 644. The p-well region 648 includes a p+ contact region 649. The p+ contact region 649 is connected to the modulated GND voltage NGND and provides a bias voltage of the p-well region 648.

The partial area of the TSC 640, including the n-well region 644, is operated with the fourth power VDD and the modulated GND voltage NGND respectively received as the operating power VDD and the GND voltage VSS. The partial area of the TSC 640, including the n-well region 644, may be designed such that circuits associated with a driving operation of the touch screen panel 320 are arranged therein. In the remaining area of the TSC 640, circuits that interface with the host are arranged. The remaining area of the TSC 640 is operated with the normal GND voltage VSS other than the modulated GND voltage NGND and the operating power VDD. Accordingly, the TSC 640 and the host may transmit or receive the second interface signal TIS to or from each other without level compensation.

In an exemplary embodiment of the inventive concept, the modulated GND voltage NGND may oscillate between two predetermined voltage levels V1 and V2 and oscillate in a square wave shape, as shown in FIG. 4A, a sine wave shape, as shown in FIG. 4B, or a chopping wave shape, as shown in FIG. 4C, according to an interface signal TIS that is output by the TSC 640.

Figure 6A:
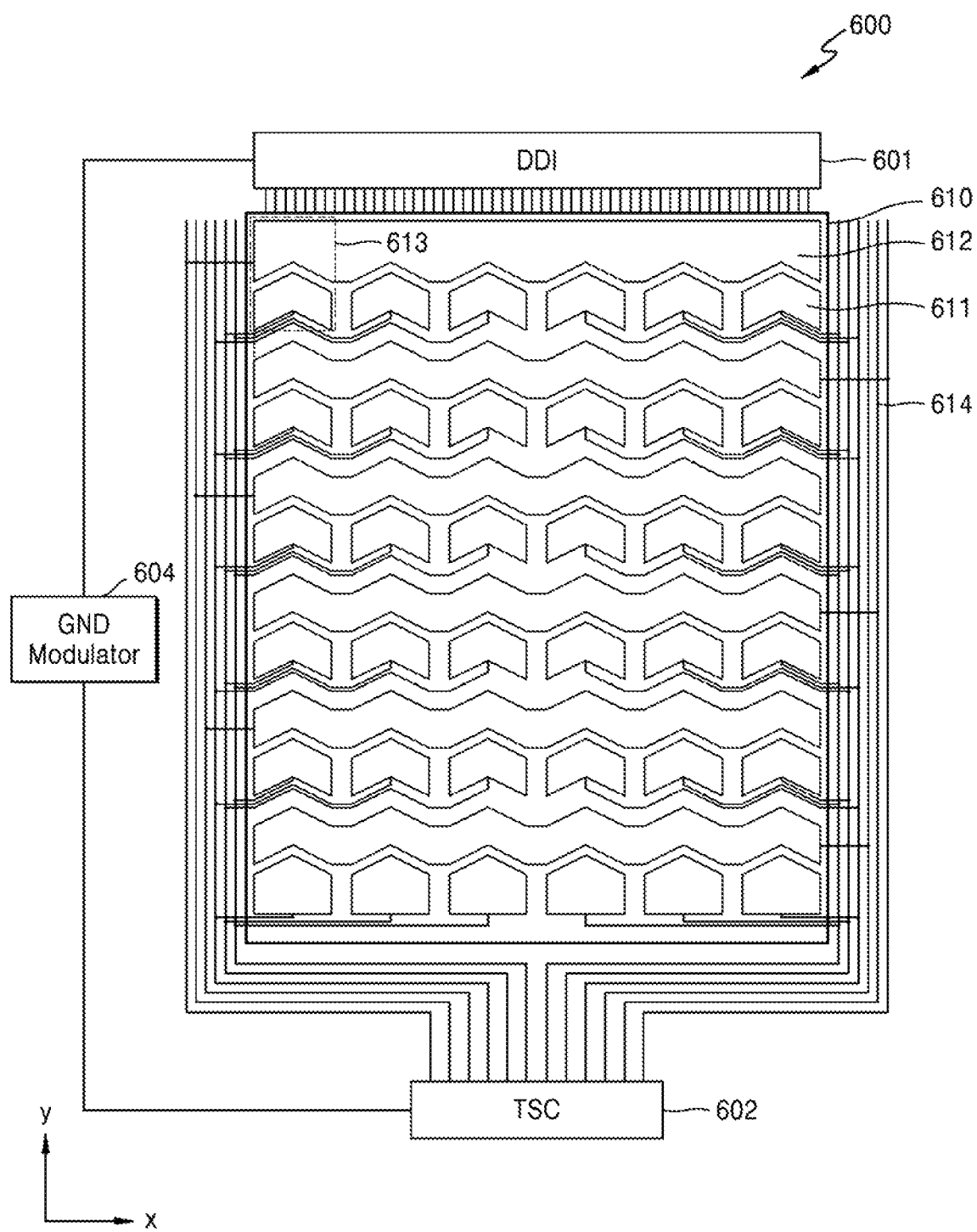
FIGS. 6A-6C are schematic diagrams illustrating touch display systems including GND modulators, according to exemplary embodiments of the inventive concept.
Figure 6B:
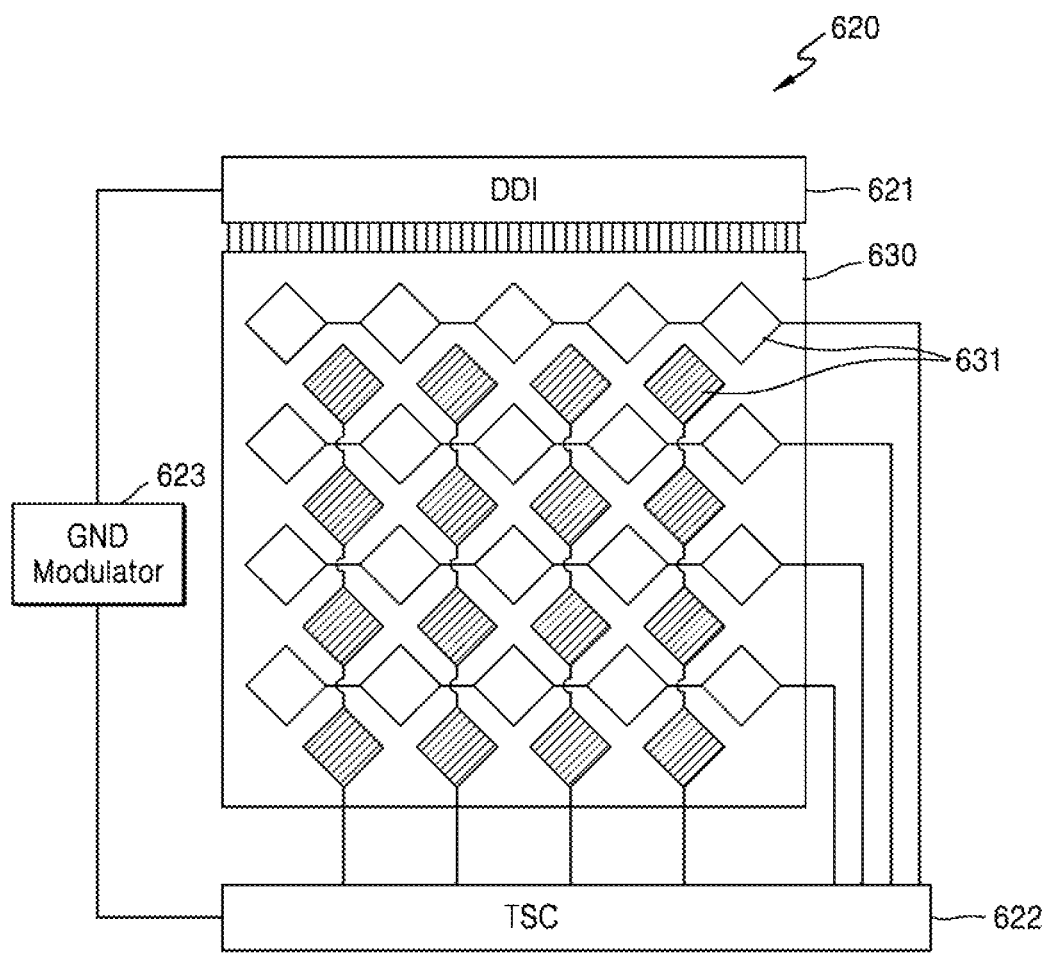
Figure 6C:
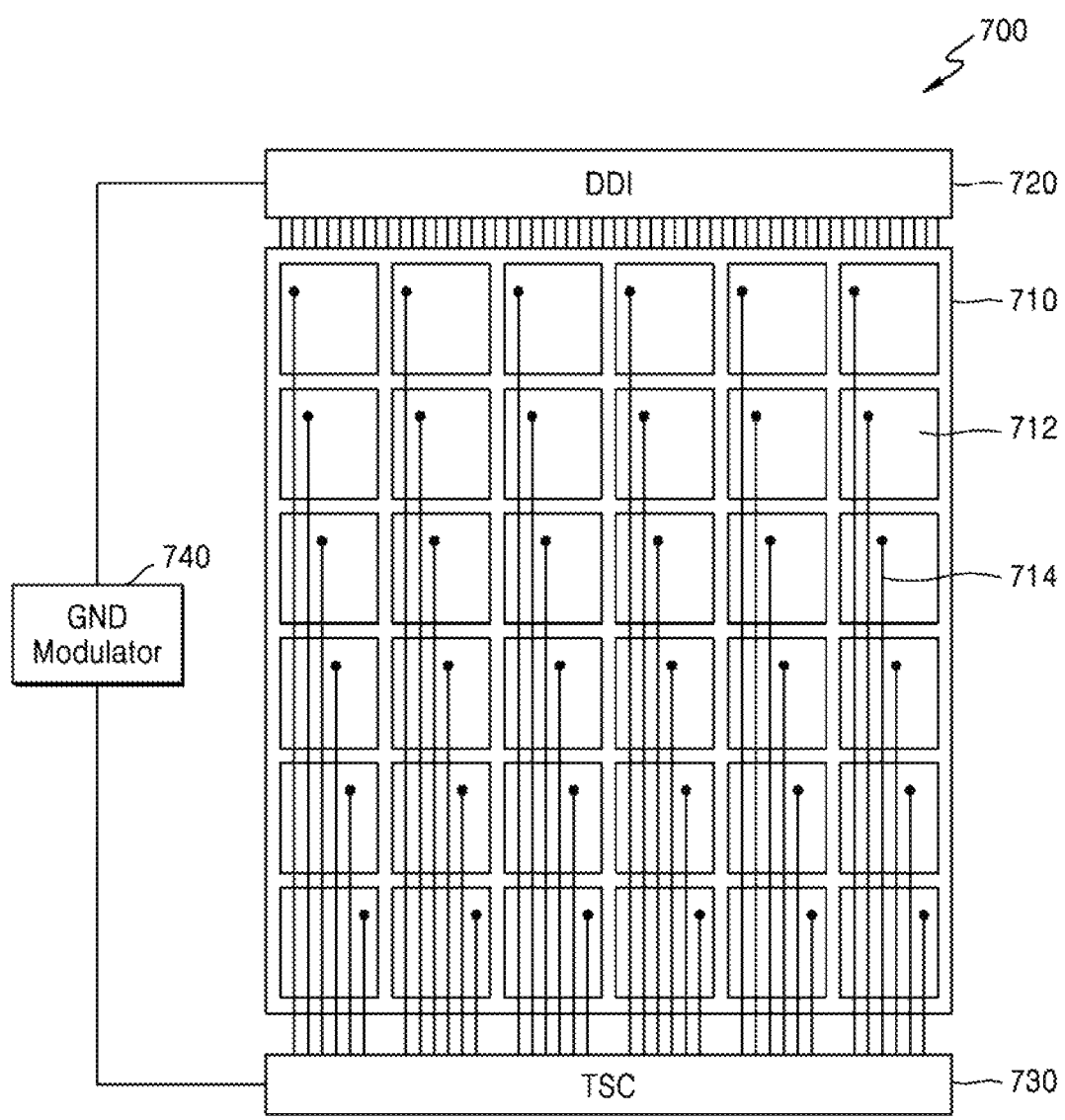

FIGS. 6A-6C are schematic diagrams illustrating touch display systems including GND modulators, according to exemplary embodiments of the inventive concept.

Referring to FIG. 6A, a touch display system 600 includes a DDI 601 driving a display panel 610, and a TSC 602 driving touch sensor electrodes 611 and 612 of a touch screen panel. The touch sensor electrodes 611 and 612 are patterned on the display panel 610. A plurality of first touch sensor electrodes 611 sense a location of a touch in a first direction, for example, an x-axis direction, and a plurality of second touch sensor electrodes 612 sense a location of the touch in a second direction, for example, a y-axis direction. The first and second directions cross each other. A plurality of channel lines 614 may be electrically connected to the first touch sensor electrodes 611 and the second touch sensor electrodes 612 and transmit a signal applied from the outside to the first and second touch sensor electrodes 611 and 612. The plurality of signal lines 614 may output to the outside a signal generated in the first and second touch sensor electrodes 611 and 612.

A first touch sensor electrode 611 and a portion of a second touch sensor electrode 612 that is adjacent to the first touch sensor electrode 611 may be included in a sensing node 613. In mutual capacitance type touch screen panels, constant voltage pulses are applied to a drive electrode, and a receive electrode collects charges corresponding to the voltage pulses. When a conductive material, such as a finger or touch pen of a human, is placed between the two electrodes, an electric field changes, and thus a contact is sensed via a change in capacitance between the two electrodes. According to an exemplary embodiment of the inventive concept, the second touch sensor electrodes 612 may be drive electrodes, and the first touch sensor electrodes 611 may be receive electrodes. Alternatively, the first touch sensor electrodes 611 may be drive electrodes, and the second touch sensor electrodes 612 may be receive electrodes.

The DDI 601 and the TSC 602 are connected to a GND modulator 604 which generates a modulated GND voltage NGND. As described above with reference to FIGS. 4A-4C, the GND modulator 604 may generate the modulated GND voltage NGND in a square wave shape, a sine wave shape, or a chopping wave that oscillates between the two predetermined voltage levels V1 and V2.

Referring to FIG. 6B, a touch display system 620 includes a DDI 621 driving a display panel 630, and a TSC 622 driving touch sensor electrodes 631 of a touch screen panel. The touch sensor electrodes 631 are patterned on the display panel 630.

The touch sensor electrodes 631 are arranged in rows, and touch sensor electrodes 631 in each row are electrically connected to one another. The touch sensor electrodes 631 are arranged in columns, and touch sensor electrodes 631 in each column are electrically connected to one another. The TSC 621 may generate a sensing signal by sensing capacitance changes of a plurality of rows of touch sensor electrodes 631 and a plurality of columns of touch sensor electrodes 631. The TSC 621 may process the sensing signal to generate touch data.

The DDI 621 and the TSC 622 are connected to a GND modulator 623 which generates a modulated GND voltage NGND. As described above with reference to FIGS. 4A-4C, the GND modulator 623 may generate the modulated GND voltage NGND in a square wave shape, a sine wave shape, or a chopping wave that oscillates between the two predetermined voltage levels V1 and V2.

Referring to FIG. 6C, a touch display system 700 includes a DDI 720 driving a display panel 710, and a TSC 730 driving touch sensor electrodes 712 of a touch screen panel. The DDI 720 and the TSC 730 are connected to a GND modulator 740 which generates a modulated GND voltage NGND. As described above with reference to FIGS. 4A-4C, the GND modulator 740 may generate the modulated GND voltage NGND in a square wave shape, a sine wave shape, or a chopping wave that oscillates between the two predetermined voltage levels V1 and V2. The GND modulator 740 may be realized as a separate IC outside a PMIC.

Each of the touch sensor electrodes 712 is connected to the TSC 730 via a corresponding channel 714 connected to the touch sensor electrodes 712. Each of the touch sensor electrodes 712 operates as a dot sensor. In the dot sensor, a ghost point does not appear at a multi-touch on the touch screen panel.

Since the modulated GND voltage NGND is commonly connected to the DDI 720 and the TSC 730 and thus a potential on both ends of a parasitic capacitance between ELVSS common electrodes of the display panel 710 and the touch sensor electrodes 712 is uniformly maintained without changes, the parasitic capacitance need not be charged or discharged. Accordingly, even when the parasitic capacitance between the ELVSS common electrodes of the display panel 710 and the touch sensor electrodes 712 increases, power consumption does not increase.

Figure 7:
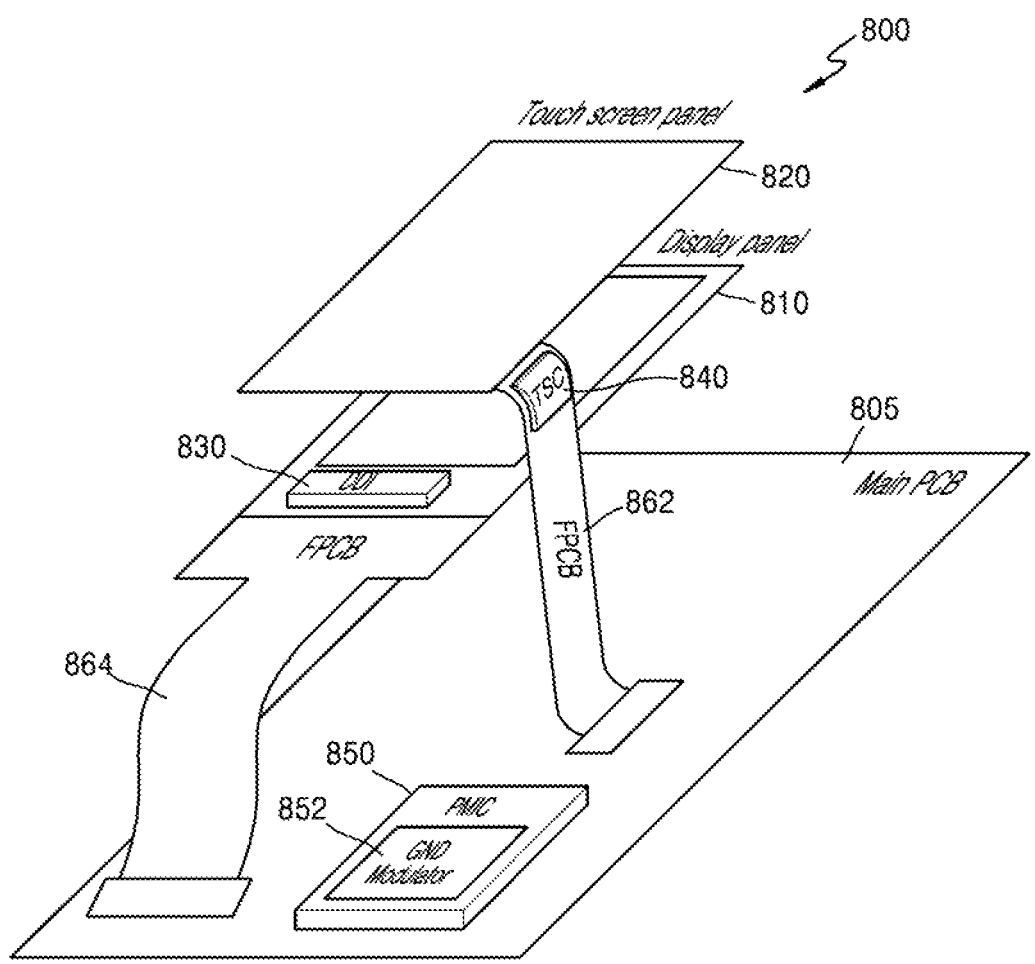
FIG. 7 is a diagram illustrating a printed circuit board (PCB) structure of a touch display device including a GND modulator, according to an exemplary embodiment of the inventive concept.

FIG. 7 is a diagram illustrating a printed circuit board (PCB) structure of a touch display device including a GND modulator 852, according to an exemplary embodiment of the inventive concept.

Referring to FIG. 7, a touch display system 800 includes a display panel 810 and a touch screen panel 820 that are discrete panels. In an exemplary embodiment of the inventive concept, the touch screen panel 820 is disposed on the display panel 810. A DDI 830 is mounted on the display panel 810, and the display panel 810 is connected to a main PCB 805 through a flexible printed circuit board (FPCB) 864. The touch screen panel 820 is connected to the main PCB 805 through an FPCB 862. A TSC 840 may be mounted on the FPCB 862. According to an exemplary embodiment of the inventive concept, the TSC 840 may be mounted on the main PCB 805.

The DDI 830 and the TSC 840 receive power voltages from a PMIC 850 mounted on the main PCB 805, respectively, through the FPCB 864 and the FPCB 862. The PMIC 850 provides a modulated GND voltage NGND generated by the GND modulator 852 to both the DDI 830 and the TSC 840. According to an exemplary embodiment of the inventive concept, the GND modulator 852 may be realized as a separate IC outside the PMIC 850. For example, the GND modulator 852 may be disposed on the main PCB 805.

Since the modulated GND voltage NGND is commonly connected to the DDI 830 and the TSC 840 and thus a potential on both ends of a parasitic capacitance between ELVSS common electrodes of the display panel 810 and touch sensor electrodes of the touch screen panel 820 is uniformly maintained without changes, the parasitic capacitance need not be charged or discharged. Accordingly, even when the parasitic capacitance between the ELVSS common electrodes of the display panel 810 and the touch sensor electrodes of the touch screen panel 820 increases, power consumption does not occur.

Figure 8:
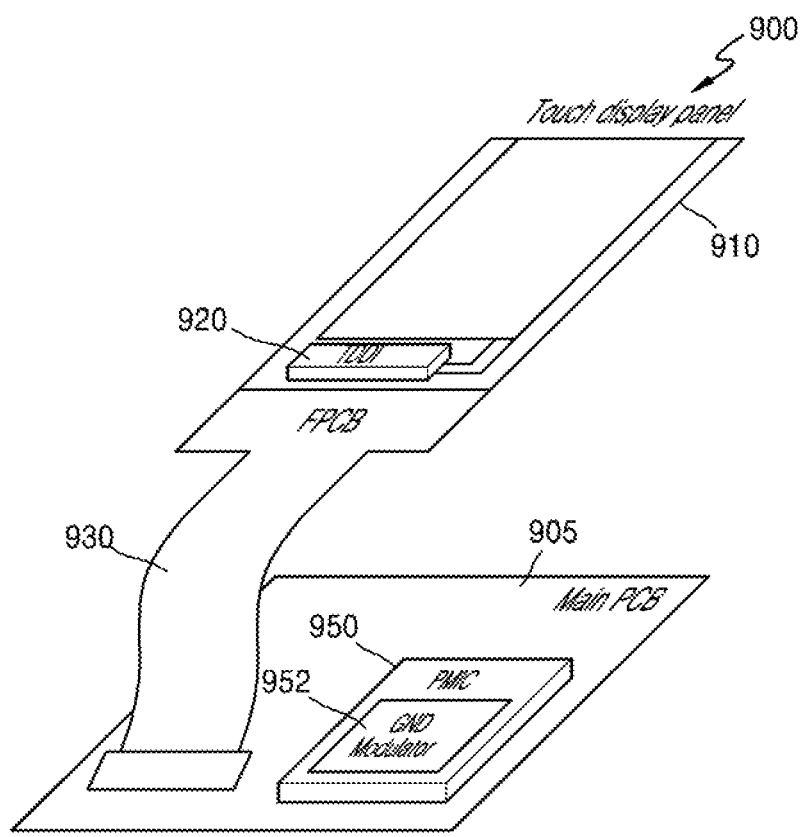
FIG. 8 is a diagram illustrating a PCB structure of a touch display device including a GND modulator, according to an exemplary embodiment of the inventive concept.

FIG. 8 illustrates a PCB structure of a touch display device including a GND modulator 952, according to an exemplary embodiment of the inventive concept.

Referring to FIG. 8, a touch display system 900 includes a touch display panel 910 in which a display panel and a touch screen panel are integrated. In the touch display panel 910, the touch screen panel need not be formed on a separate glass substrate but may be formed by patterning a transparent electrode on an upper plate of the display panel. The touch display panel 910 includes a touch display driver integration (TDDI) 920 formed thereon. The TDDI 920 is obtained by integrating a DDI and a TSC into a single semiconductor chip. The TDDI 920 drives the touch display panel 910 and is connected to a main PCB 905 via an FPCB 930.

The TDDI 920 receives power voltages from a PMIC 950 mounted on the main PCB 905. The PMIC 950 provides a modulated GND voltage NGND generated by the GND modulator 952 to the TDDI 920. According to an exemplary embodiment of the inventive concept, the GND modulator 952 may be realized as a separate IC outside the PMIC 950. Since the modulated GND voltage NGND is connected to the TDDI 920 and thus a potential on both ends of a parasitic capacitance between ELVSS common electrodes of the display panel and touch sensor electrodes of the touch screen panel is uniformly maintained without changes, the parasitic capacitance need not be charged nor discharged. Accordingly, even when the parasitic capacitance between the ELVSS common electrodes of the display panel and the touch sensor electrodes of the touch screen panel increases, power consumption does not occur.

While the inventive concept has been particularly shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A touch display system comprising:
 a display system comprising a plurality of pixels;
 a touch system disposed on the display system and comprising a plurality of touch sensor electrodes; and
 a power management integrated circuit (PMIC) configured to supply power and a modulated ground (GND) voltage to the display system and the touch system,
 wherein the modulated ground (GND) voltage is modulated by a ground modulator from a constant voltage to oscillate between two predetermined voltage levels, the display system and the touch system are disposed within different panels, and the modulated GND voltage is commonly connected to the display system within a first panel and a touch system within a second panel different from the first panel such that the modulated GND voltage simultaneously acts as ground voltage for the display system and the touch system.

2. The touch display system of claim 1, wherein the modulated GND voltage oscillates in a square wave shape or a chopping wave shape.

3. The touch display system of claim 1, wherein:
 a display drive integrated circuit (DDI) is configured to drive the display system; and
 a touch screen controller (TSC) is configured to drive the touch system, wherein the modulated GND voltage is connected to GND voltages of the DDI and the TSC.

4. The touch display system of claim 3, wherein the ground modulator is configured to generate the modulated GND voltage based on an interface signal output by the TSC, wherein the ground modulator is disposed inside or outside of the PMIC.

5. The touch display system of claim 1, wherein touch sensor electrodes of the touch screen panel are dot sensors driven in a self capacitance method via channels respectively connected to the touch sensor electrodes.

6. The touch display system of claim 1, wherein the interface signal which drives the touch system and is used to modulate the modulated ground voltage is output by a touch screen controller (TSC) which drives the touch system.

7. A touch display system comprising:
 a display system comprising a plurality of pixels;
 a touch system disposed on the display system and comprising a plurality of touch sensor electrodes;
 a power management integrated circuit (PMIC) configured to supply power and a modulated ground (GND) voltage to the display system and the touch system;
 a display drive integrated circuit (DDI) configured to drive the display system; and
 a touch screen controller (TSC) configured to drive the touch system, wherein the modulated GND voltage is connected to GND voltages of the DDI and the TSC,
 wherein the PMIC generates a first internal power having a positive voltage level and a second internal power having a negative voltage level, the first internal power and the modulated GND voltage are provided to a first low-dropout (LDO) regulator, wherein the first LDO regulator outputs a first power, the second internal power and the modulated GND voltage are provided to a second LDO regulator, wherein the second LDO regulator outputs a second power, and the first power and the second power are provided to the display system.

8. The touch display system of claim 7, wherein the PMIC generates a third internal power having a lower voltage level than the first internal power and a fourth internal power having a lower voltage level than the third internal power, the third internal power and the modulated GND voltage are provided to a third LDO regulator, wherein the third LDO regulator outputs a third power, and the DDI is driven based on the third power and the modulated GND voltage, and the fourth internal power and the modulated GND voltage are provided to a fourth LDO regulator, wherein the fourth LDO regulator outputs a fourth power, and the TSC is driven based on the fourth power and the modulated GND voltage.

9. The touch display system of claim 8, wherein interface signals respectively output by the DDI and the TSC have levels that are changed by the modulated (NI) voltage, and the PMIC further comprises a plurality of level shifters configured to compensate for the changed levels of the interface signals output by the DDI and the TSC, respectively, and to provide interface signals having compensated levels to a host.

10. The touch display system of claim 9, wherein a first level shifter of the plurality of level shifters to which a first interface signal output by the DDI is supplied is connected to a second level shifter of the plurality of level shifters to which a second interface signal output by the TSC is supplied, and the first and second interface signals are transmitted between the DDI and the TSC.

11. A touch display system comprising:
a display panel comprising a plurality of pixels;
a touch screen panel disposed on the display panel and comprising a plurality of touch sensor electrodes;
a display drive integrated circuit (DDI) configured to drive the display panel;
a touch screen controller (TSC) configured to drive the touch screen panel; and
a power management integrated circuit (PMIC) configured to supply power and a modulated ground (GND) voltage, that oscillates in a square wave shape or a chopping wave shape, to the display panel, the touch screen panel, the DDI, and the TSC,
wherein the modulated GND voltage is supplied to a first portion of the DDI and a first portion of the TSC, and
wherein the modulated GND voltage is modulated by a ground modulator, the modulated GND voltage being commonly connected to the first portions of the DDI and the TSC and modulated from a constant voltage to oscillate between two predetermined voltage levels,
wherein the modulated GND voltage is commonly connected to the display panel and the touch screen panel that is distinct from the display panel such that the modulated GND voltage simultaneously acts as around voltage for the two distinct panels.

12. The touch display system of claim 11, wherein circuits associated with a driving operation of the display panel are disposed in the first portion of the DDI, and circuits that generate a first interface signal that is provided to a host are disposed in a second portion of the DDI that excludes the first portion of the DDI.

13. The touch display system of claim 11, wherein circuits associated with a driving operation of the touch screen panel are disposed in the first portion of the TSC, and circuits that generate a second interface signal that is provided to a host are disposed in a second portion of the TSC that excludes the first portion of the TSC.

14. The touch display system of claim 11, wherein the modulated GND voltage oscillates according to an interface signal that is output by the TSC.

15. The touch display system of claim 11, wherein the plurality of touch sensor electrodes of the touch screen panel are dot sensors driven in a self capacitance method using channels that electrically connect respective touch sensor electrodes of the plurality of touch sensor electrodes and the TSC.

16. A touch display system comprising:
a main printed circuit board (PCB);
a display panel;
a touch screen panel disposed on the display panel; and
a power management integrated circuit (PMIC) disposed on the main PCB, wherein the PMIC is configured to supply power and a modulated ground (GND) voltage to a display drive integrated circuit (DDI) and to a touch screen controller (TSC), wherein the DDI is configured to drive the display panel, and wherein the TSC is configured to drive the touch screen panel,
wherein the modulated ground (GND) voltage is modulated based on an interface signal output by the touch screen controller (TSC),
wherein the modulated GND voltage is modulated by a ground modulator, the modulated GND voltage being commonly connected to the DDI and the TSC and modulated from a constant voltage to oscillate between two predetermined voltage levels
wherein the modulated GND voltage is commonly connected to the display panel and the touch screen panel that is distinct from the display panel such that the modulated GND voltage simultaneously acts as ground voltage for the two distinct panels.

17. The touch display system of claim 16, wherein the PMIC is electrically connected to the display panel through a first flexible printed circuit board (FPCB) and the PMIC is electrically connected to the touch screen panel through a second FPCB.

18. The touch display system of claim 17, wherein the TSC is disposed on the second FPCB and the DDI is disposed on the display panel.

19. The touch display system of claim 16, the ground modulator is disposed on the main PCB.

20. The touch display system of claim 16, wherein the touch screen panel includes transparent electrodes electrically connected to the TSC.

* * * * *